United States Patent [19]
Shuster

[11] Patent Number: 5,996,000
[45] Date of Patent: *Nov. 30, 1999

[54] METHOD AND APPARATUS FOR USING DISTRIBUTED MULTIMEDIA INFORMATION

[75] Inventor: Brian Shuster, Beverly Hills, Calif.

[73] Assignee: United Leisure, Inc., Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/899,712

[22] Filed: Jul. 23, 1997

[51] Int. Cl.$^6$ .............................. G06F 17/30; G06F 13/00
[52] U.S. Cl. .......................... 709/201; 709/200; 709/203; 707/104
[58] Field of Search .......................... 395/200.3, 200.31, 395/200.32; 707/104; 709/200, 201, 202, 227, 229, 203

[56] References Cited

U.S. PATENT DOCUMENTS

| | | | |
|---|---|---|---|
| 5,640,560 | 6/1997 | Smith | 707/104 |
| 5,727,129 | 3/1998 | Barrett et al. | 395/12 |
| 5,737,495 | 4/1998 | Adams et al. | 707/104 |
| 5,751,968 | 5/1998 | Cohen | 395/200.61 |
| 5,752,246 | 5/1998 | Rogers et al. | 707/10 |
| 5,774,660 | 6/1998 | Brendel et al. | 395/200.31 |
| 5,774,670 | 6/1998 | Montulli | 709/227 |
| 5,796,952 | 8/1998 | Davis et al. | 709/224 |
| 5,802,299 | 9/1998 | Logan et al. | 709/218 |
| 5,809,512 | 9/1998 | Kato | 707/502 |
| 5,892,825 | 4/1999 | Mages et al. | 380/3 |

OTHER PUBLICATIONS

Info@CoolSaving.com; New CoolSavings Offers from Kodak Photonet Online, Reel.com, Garden.com, Value America, Digital Chef, BigStar.com and more! Apr. 1999, pp. 1–6.
Abstract of EP 798635.
Abstract of EP 97307453 970924.
Abstract of EP 97116792 970926.
Abstract of EP 96305432 960724.
Abstract of PC Week, Sep. 23, 1996, vol. 3, No. 38 1 page.
"InterVu leads the new frontier in affordable video delivery with the MAC MPEG Player.", Business Wire Apr. 29, 1996.
"Caligari's New VRML Browsing and Authoring Tool now available On Line", PR Newswire, Oct. 31, 1995.
"Hitachi Announces Compatibility of MPEG Digital Video Camera with Microsoft Direct Show", Business Wire, Oct. 6, 1997.
"Iterated System Ports Fractal Viewer and Coolfusion to Microsoft Internet Explorer V3", PR Newswire, Apr. 16, 1996.

*Primary Examiner*—Krisna Lim

[57] ABSTRACT

A system for merging text with distributed multimedia information comprising a processor, a network interface, a display, and a memory. The memory is configured to cause said processor to receive a request in said browser application to present said distributed multimedia information; launch said multimedia file presentation application; validate said distributed multimedia information; pass a pointer to said distributed multimedia information to said media command interrupt layer; and display said multimedia information.

12 Claims, 4 Drawing Sheets

METHOD AND APPARATUS FOR USING DISTRIBUTED MULTIMEDIA INFORMATION

BACKGROUND OF THE INVENTION

1. Field of the Invention

The present invention relates to the field of use of presenting multimedia information using a computer network. More particularly, the present invention relates to presenting distributed multimedia information.

2. Description of Related Art

Currently, content providers who wish to provide multimedia data such as video and audio data to users over a network such as the Internet must be cognizant of the size of the multimedia data to be transferred as most users will not be willing to endure the length of time required to transfer large files. In addition, transferring large files poses other problems in cases where users do not have a stable network connection. This leads to interrupted information transfer, which in turn results in wasted bandwidth and time to perform re-transfers.

For example, assuming no control information overhead and perfect line conditions, a file that is one megabyte (MB) in size will take approximately 5 minutes to transfer using a modem having a transfer speed of 28,800 bits of second. However, under normal conditions, accounting for overhead data and imperfect line conditions, the transfer often takes much longer. With multimedia data files becoming larger in order to contain the length of materials desired, including book audio and video data, the time required for transferring these files are also becoming larger.

Although advances in communications networks have been made to increase the transfer speed of these files, the rate at which files are growing is still outpacing the rate at which transfer speeds are increasing. Consequently, content providers must design "web-sites," which are comprised of files containing hyper-text markup language (HTML), digital audio and video information, so as not require a significant amount of time or network resources to load. Unfortunately, this means that content providers have to use lower quality versions of multimedia files, which has been subjected to some data compression schemes, to present their messages.

The network constraints described above are not acceptable for applications where large multimedia files must be transferred. For example, in a web-site containing various advertisements for cruise ship utilizing audio/video information in addition to text, a content provider might desire to play a sample video for each cruise package in which a user expresses an interest. However, with the current level of network technology that is available to a majority of users, this desire is not achievable.

A proposed solution is to pre-distribute the multimedia data using removable media to an interested user which will allow the user to have any necessary information locally and thus by-pass a download of large multimedia data files. The user can then view video or listen to audio in conjunction with using a browser application to access a content provider's web-site without having to wait for the multimedia to be transferred over the network. However, a solution is necessary to provide integration of the display of the local multimedia information with the information that is displayed in the browser application.

SUMMARY OF THE INVENTION

The present invention utilizes custom software in a computer system having a processor, memory, a removable media data storage device, a graphics card, a display, and a network interface to allow the presenting of multimedia information which is contained on removable media and is triggered based upon the actions of the user using a browser application in viewing a content provider's website.

The custom software will be installed into the computer system from either the network (e.g., from the content provider's server) or the removable media storage device. The custom software will allow the user to access the databases and services of a content provider, and to trigger the presentation of multimedia information (such as audio or video data) based on the user's actions of "browsing" the content provider's website. The multimedia information resides on removable media which is distributed to the user and placed by the user into the removable media storage device. By distributing the removable media containing the multimedia information to the user before the user accesses the content provider's website, the user would not have to transfer the multimedia information from the content provider's website. Instead, the multimedia information will be accessable locally.

In one embodiment, the content provider is a travel agent having a server on the Internet providing users with hyper text mark-up language (HTML) documents. A user would be able to select links in a world-wide-web (WWW) browser application to receive tour information from the server and to trigger the presentation of multimedia data contained on the removable media. The removable media could be media such as compact disk read-only memory (CD-ROM) media.

The multimedia information on the CD-ROM allows a user to preview particular tour packages of interest. The user may also access one or more corresponding databases for volatile information such as tour prices, and availability. When the user has decided which tour they intend to schedule, the user may finalize the transaction by actually booking the tour using the travel agents scheduling system which will make the appropriate scheduling arrangements with a tour provider.

DETAILED DESCRIPTION OF THE INVENTION

The present invention provides a method and apparatus for presenting distributed multimedia information. For purposes of explanation, specific embodiments are set forth to provide a thorough understanding of the present invention. However, it will be understood by one skilled in the art, from reading this disclosure, that the invention may be practiced without these details. Further, although the present invention is described through the use of the internet and the world wide web, most, if not all, aspects of the invention apply to networks and client/server applications in general. Moreover, well-known elements, devices, process steps and the like are not set forth in detail in order to avoid obscuring the present invention.

Figure 1:
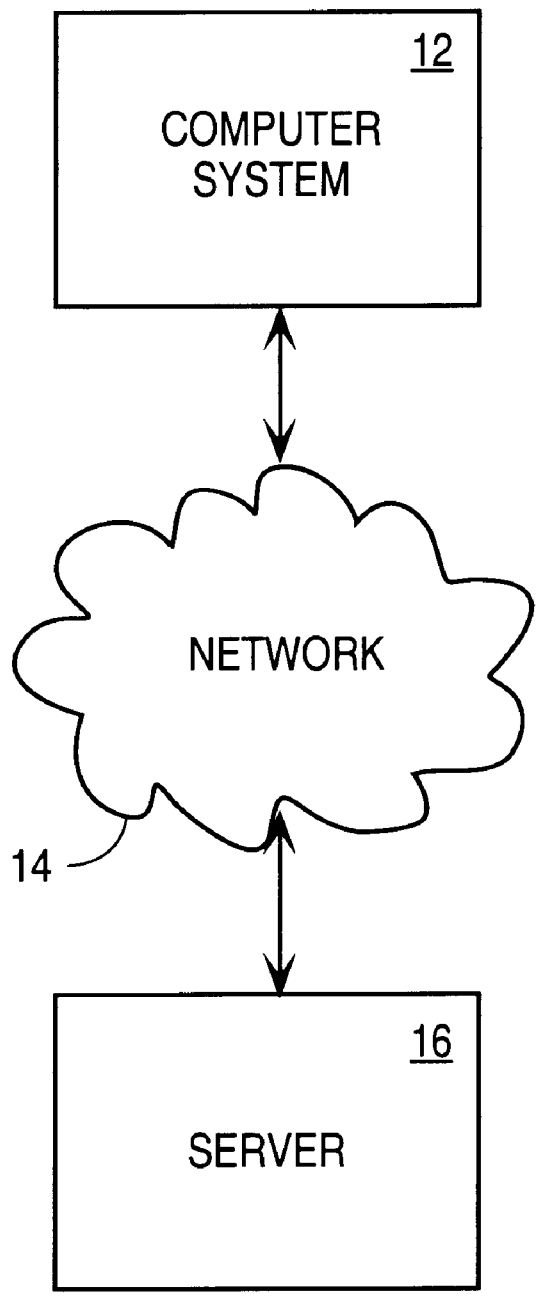
FIG. 1 is a block diagram of a network configured in accordance with the present invention.

FIG. 1 illustrates a network configured in accordance with the present invention, including a computer system 12, a network 14, and a server 16. Aside from the inventive portions of computer system 12, as discussed below, computer system 12 represents a general purpose computer which is configured communicate with other computers such as server 16 over network 14. Similarly, server 16 represents a general purpose computer configured to communicate with other computers over network 14 to provide text and other data to client computers such as computer system 12.

In a preferred embodiment, network 14 is a wide-area network such as the Internet. However, network 14 can be of any type of network, or even be composed of several heterogenous networks. Therefore, in other embodiments, network 14 can be a local area network, or a combination of local and wide area networks.

In the preferred embodiment, server 16 is a hyper-text transport protocol (HTTP) server that can provide text and other data to the various computer systems connected to network 14. Server 16 can also be configured to perform as a file transfer protocol (FTP) server which allows clients to access files located on the server.

Figure 2:
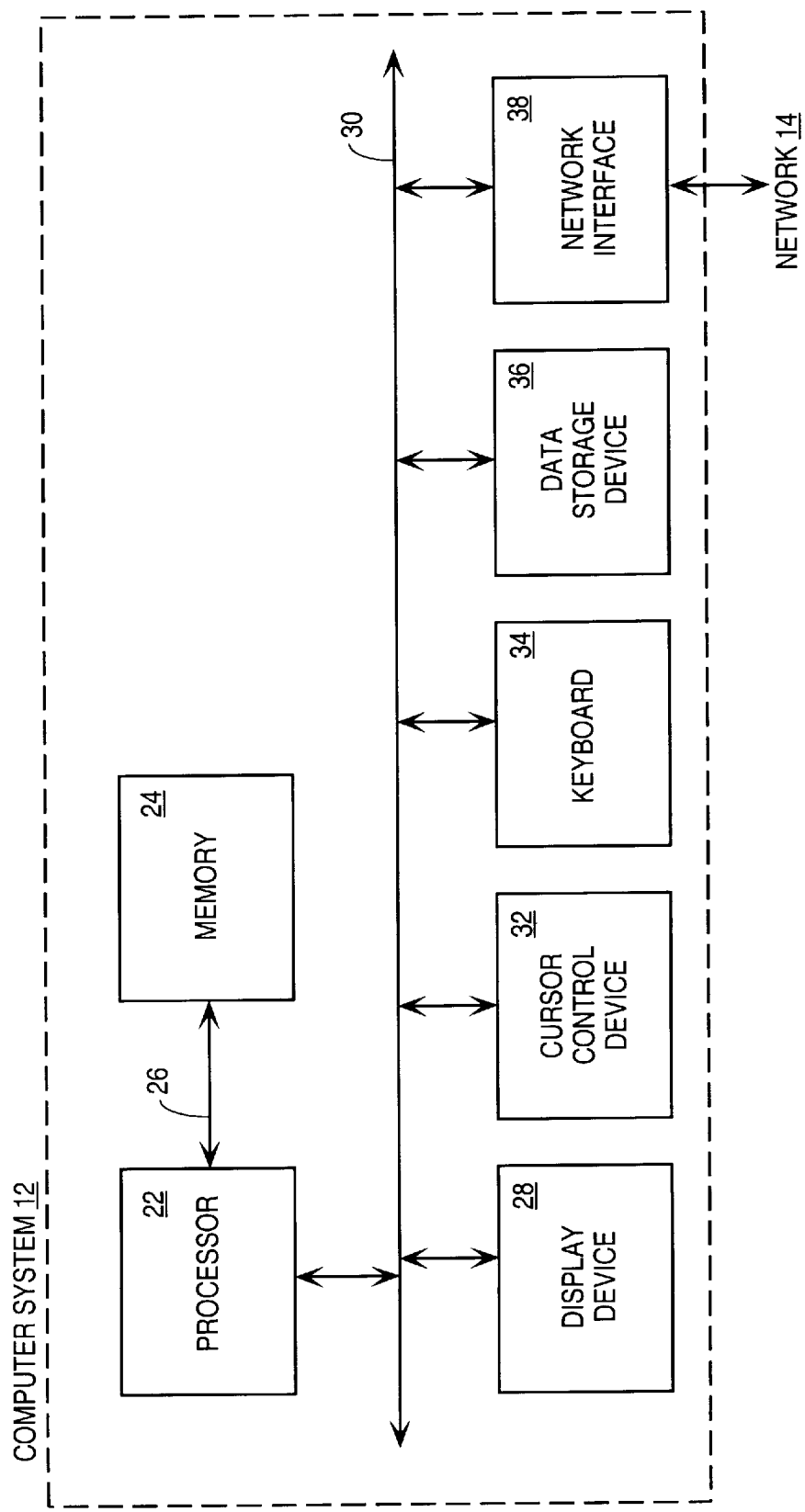
FIG. 2 is a block diagram of a computer system configured in accordance with the present invention.

FIG. 2 illustrates a preferred embodiment of computer system 12, including a processor 22 coupled to a memory 24 over a memory bus 26 and a display device 28 coupled to processor 22 over a system bus 30. System bus 30 is also coupled to a cursor control device 32, a keyboard 34, a data storage device 36, and a network interface 38.

Computer system 12 includes system bus 30 for communicating information, and processor 22 is coupled to system bus 30 for processing information. Memory 24 can be random access memory (RAM) or another dynamic storage device and is coupled to system bus 30 for storing information and instructions to be executed by processor 22. Memory 24 may also be used for storing temporary variables or other intermediate information during execution of instructions by processor 22.

Data storage device 36 is coupled to system bus 30 for storing information and instructions and can be a device such as a magnetic disk or optical disk data storage device, and is coupled to the other components of computer system 12 through the use of system bus 30. In the preferred embodiment, data storage device 36 is a removable media device such as a compact disk-read only memory (CD-ROM) drive. The removable media (e.g., the CD-ROM) could be distributed to users by mail or other means. Therefore, a user would have the removable media available to be placed into the removable media device at the appropriate time, as explained below. It is to be noted that data storage device 36 can be composed of several data storage devices instead of only the removable media device. Thus, in alternative embodiments data storage device 36 can represent a multiple disk array of "hard disks" (i.e., magnetic disk media), removable media devices, and other data storage devices.

Display device 28, which is a device such as a cathode ray tube (CRT), is also coupled to the other components in computer system 12 via system bus 30, for displaying information to a computer user. Keyboard 34, which is an alphanumeric input device including alphanumeric and other keys, is typically coupled to system bus 30 for communicating information and command selections to processor 22. Another type of user input device is cursor control device 32, such as a mouse, a trackball, or cursor direction keys for communicating direction information and command selections to processor 22 and for controlling cursor movement on display device 28. This input device typically has two degrees of freedom in two axes, a first axis (e.g., x) and a second axis (e.g., y), which allows the device to specify positions in a plane.

Operating system 56 is a general purpose operating system which works with computer system 12 to provide the necessary system for the other software components discussed herein. Other than what is necessary to provide the functionality needed in the present invention, operating system 56 is similar to other operating systems of the prior art.

Figure 3:
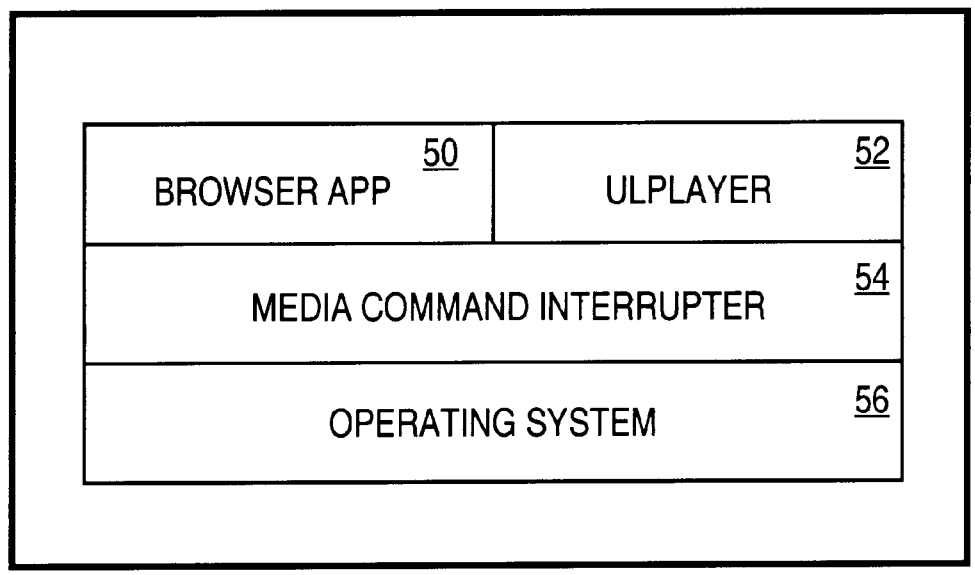
FIG. 3 illustrates a memory of computer system configured in accordance with the present invention.

FIG. 3 is a block diagram of a preferred embodiment of memory 24 of computer system 12 containing a browser application 50, a ULplayer 52, a media command interrupter (MCI) system layer 54, and a operating system 56. The contents of memory 24 can be loaded from data storage device 36 or retrieved from a server over network 14.

In the preferred embodiment of the present invention, browser application 50 interprets and displays files coded in hyper-text mark-up language (HTML). Browser application 50 also initiates external procedure calls to operating system 56 and other applications such as ULplayer 52. The functionality of browser application 50 can be extended by using plug-ins, which are loaded at execution time of browser application 50.

ULplayer 52 is used to control the retrieval and presentation of multimedia information contained in data storage device 36. Thus, as described below, ULplayer 52 contains the following functions: VOLUME, VERSION, DISK, OPEN, EXECUTE, PUT_WINDOW_AT, and PLAY.

The VOLUME function allows ULplayer 52 to search data storage device 36 for a removable media with a particular label, the label being a series of alphanumeric characters, a series of bits. Thus, for example, ULplayer 52 would be able to look for the correct volume identification in a system with multiple volume.

The VERSION function allows ULplayer 52 to check to see if the removable media is the correct version. This is to ensure that ULplayer 52 would only play the most recent version of the multimedia files.

ULplayer 52 provides the DISK function to check and see if the removable media currently being accessed has the correct identification number.

To play a multimedia file, ULplayer 52 provides an OPEN function to open a multimedia file to send to MCI system layer 54.

ULplayer 52 also uses the PUT_WINDOW_AT function to display a window in which a multimedia file will be presented, and passes the window frame information to MCI system layer 54 so that MCI system layer 54 will know where to display the video content of the multimedia file.

To actually initiate the playing of a multimedia file, ULplayer 52 has a PLAY function, which instructs MCI system layer 54 to begin playing the multimedia file by displaying the video portion in a window that has been displayed by the PUT_WINDOW_AT function. ULplayer 52 is able to search data storage device 36 and any other data storage device which is coupled to computer system 12 to find the necessary multimedia files to present. ULplayer 52 is also able to verify that the file to be presented is the appropriate version.

Figure 4:
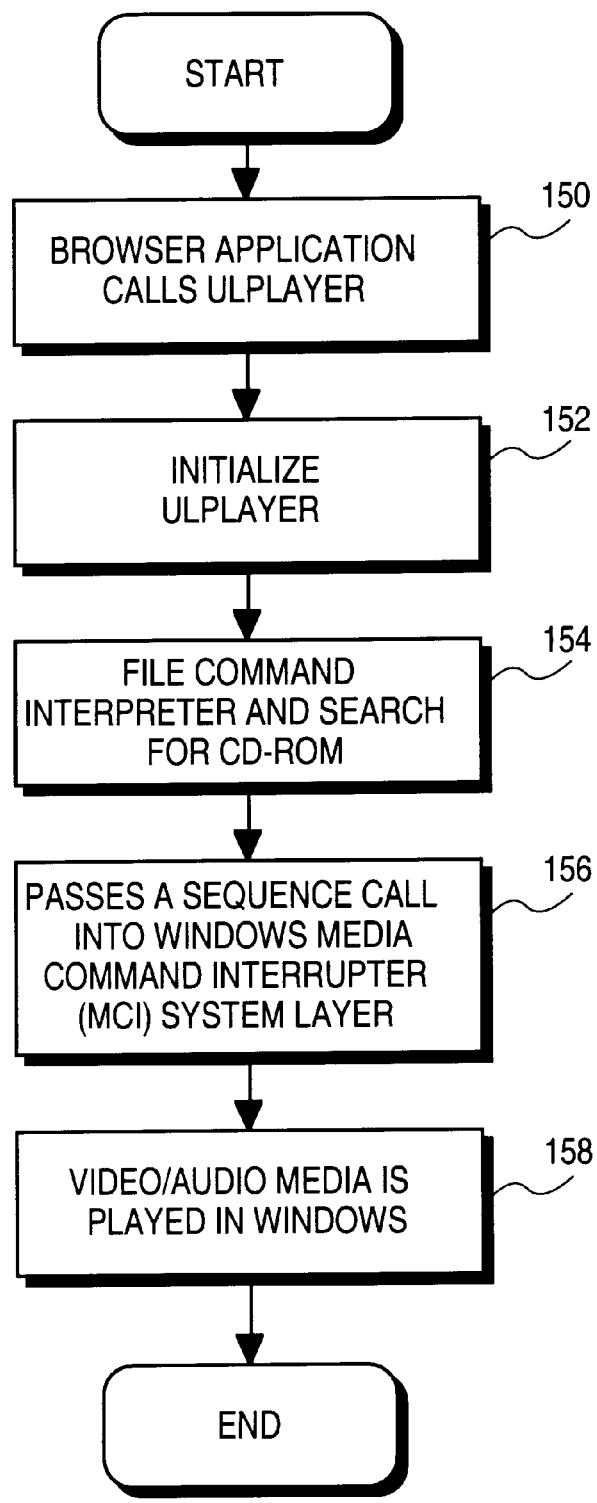
FIG. 4 is a flow diagram of a preferred mode of operation of the present invention.

FIG. 4 is a flow diagram of a preferred mode of operation of the present invention. In block 150, browser application 50 calls ULplayer 52 to initiate the playback of a multimedia file which corresponds to the selection of the user in browser application 50. For example, the user could have chosen a selection in browser application 50 to request more information about a particular cruise, vacation or cruise ship.

After browser application 50 calls ULplayer 52, operation will continue with block 152.

In block 152, ULplayer 52 is loaded into memory 24 and is initialized to begin execution. Operation will then continue with block 154.

In block 154, ULplayer 52 will perform the VOLUME function to seek the CD-ROM with the correct label. If there is no CD-ROM with the correct label contained in data storage device 36, the user will be prompted with a dialog screen requesting that the user place the CE-ROM with the correct VOLUME inside data storage device 36. After a CD-ROM with the correct label has been detected, ULplayer 52 will also perform the VERSION function, in order to check that the CD-ROM with the correct label is also the correction version of the CD-ROM. In addition, ULplayer 52 will also perform the disk function to check to see if the CD-ROM in data storage device 36 has the correct ID number. If VOLUME, VERSION, and DISK functions execute correctly, ULplayer 52 will then execute the OPEN command to open the appropriate multimedia file for display. In addition, ULplayer 52 will also execute the PUT_WINDOW_AT function to display a window on display device 28 in which MCI system layer 54 will display the multimedia file. ULplayer 52 will then perform the PLAY function, and operation will continue with block 156.

In block 156, ULplayer 52 will pass MCI system layer 54 the coordinate of the window ULplayer 52 created with the PUT_WINDOW_AT function, and ULplayer 52 also sends MCI system layer 54 the name and location of the multimedia file from which MCI system layer 54 will retrieve the necessary multimedia information to be displayed in the above-mentioned window. As noted above, this multimedia information not only includes media data, but can include audio data as well. Moreover, this multimedia information can also consist of sprites and other animation information. After ULplayer 52 calls MCI system layer 54 and provides the above information, operation will then continue with block 158.

In block 158, MCI system layer 54 will perform the playback of the multimedia file.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A client for merging information downloaded from a server with distributed multimedia information comprising:
    a processor,
    a network interface coupled to said processor for communicating with said server,
    a display coupled to said processor, and
    a memory coupled to said processor containing a browser application, a multimedia file presentation application, and a media command interrupt layer, said memory configured to cause said processor to:
        receive a request in said browser application to present said distributed multimedia information based on an interaction with said server;
        launch said multimedia file presentation application;
        validate said distributed multimedia information;
        pass a pointer referencing said distributed multimedia information to said media command interrupt layer, said pointer providing a file location for said distributed multimedia information; and
        display said multimedia information;
    wherein said distributed multimedia information may be displayed using said pointer on said display without said distributed multimedia information having to be downloaded.

2. The client of claim 1, wherein said network interface is configured to work with the Internet.

3. The client of claim 1, wherein said memory comprises a removable data storage device.

4. The client of claim 3, wherein said removable data storage device is a compact-disk read-only memory device.

5. In a client with a browser application, a multimedia file presentation application, and a media command interrupt layer, a method for presenting distributed multimedia information comprising the steps of:
    receiving a request in said browser application to present said distributed multimedia information based on an interaction with a server;
    launching said multimedia file presentation application;
    validating said distributed multimedia information;
    passing a pointer belonging to said distributed multimedia information to said media command interrupt layer, said pointer providing a file location for said distributed multimedia information; and
    displaying said distributed multimedia information;
    wherein said distributed multimedia information may be displayed using said pointer on said display without said distributed multimedia information having to be downloaded.

6. The method of claim 5, wherein said interaction includes said browser application interacting with said server over the Internet.

7. The method of claim 5, further comprising providing said distributed multimedia information on a removable data storage device.

8. The method of claim 7, wherein providing said distributed multimedia information on said removable data storage device comprises providing said distributed multimedia information on a compact-disk read-only memory device.

9. An article comprising a computer readable medium having instructions stored thereon, which when executed, causes:
    receiving a request in said browser application to present said distributed multimedia information based on an interaction with a server;
    launching said multimedia file presentation application;
    validating said distributed multimedia information;
    passing a pointer belonging to said distributed multimedia information to said media command interrupt layer, said pointer providing a file location for said distributed multimedia information; and
    displaying said multimedia information;
    wherein said distributed multimedia information may be displayed using said pointer on a display without said distributed multimedia information having to be downloaded.

10. The article of claim 9, wherein said interaction includes said browser application interacting with said server over the Internet.

11. The article of claim 9, wherein displaying said distributed multimedia information includes displaying said distributed multimedia information from a removable data storage device.

12. The client of claim 11, wherein displaying said distributed multimedia information from a removable data storage device includes displaying said distributed multimedia information from a compact-disk read-only memory device.

* * * * *

UNITED STATES PATENT AND TRADEMARK OFFICE
CERTIFICATE OF CORRECTION

PATENT NO. : 5,996,000
DATED : November 30, 1999
INVENTOR(S) : Shuster et al.

It is certified that error appears in the above-identified patent and that said Letters Patent is hereby corrected as shown below:

In column 1, line 30, delete "the time required for transferring these files are also becoming larger." and insert -- the time required for transferring these files is also becoming longer.--

In column 1, line 41, delete "which has been" and insert -- which have been --.

In column 2, line 36, delete "agents" and insert -- agent's --.

Signed and Sealed this

Twelfth Day of September, 2000

Q. TODD DICKINSON

*Attest:*

*Attesting Officer*           *Director of Patents and Trademarks*

UNITED STATES PATENT AND TRADEMARK OFFICE
CERTIFICATE OF CORRECTION

PATENT NO. : 5,996,000
DATED : November 30, 1999
INVENTOR(S) : Shuster et al.

It is certified that error appears in the above-identified patent and that said Letters Patent is hereby corrected as shown below:

Title page,
Item [54], Title, delete "METHOD AND APPARATUS FOR USING DISTRIBUTED MULTIMEDIA INFORMATION" and insert -- SYSTEM USING POINTERS FOR DISPLAYING PRE-DISTRIBUTED MULTIMEDIA INFORMATION WITH BROWSER APPLICATION --.

Item [75], Inventor(s), please insert -- Robert Eady, Ottawa, Ontario (Canada) --.
Item [74], insert -- *Attorney, Agent, or Firm*—Blakely, Sokoloff, Taylor & Zafman LLP -- before item [57], Abstract.

Signed and Sealed this

Twenty-fourth Day of December, 2002

JAMES E. ROGAN
*Director of the United States Patent and Trademark Office*